(12) United States Patent
Royyuru et al.

(10) Patent No.: US 9,436,939 B2
(45) Date of Patent: Sep. 6, 2016

(54) SELECTING MOBILE WALLET APPLICATION FOR A TRANSACTION CONDUCTED USING A SMART CARD

(71) Applicant: First Data Corporation, Greenwood Village, CO (US)

(72) Inventors: Vijay K. Royyuru, Norristown, PA (US); Dennis Ciaran O'Hegarty, Smyrna, GA (US)

(73) Assignee: FIRST DATA CORPORATION, Greenwood Village, CO (US)

( * ) Notice: Subject to any disclaimer, the term of this patent is extended or adjusted under 35 U.S.C. 154(b) by 388 days.

(21) Appl. No.: 14/022,546

(22) Filed: Sep. 10, 2013

(65) Prior Publication Data

US 2015/0073926 A1    Mar. 12, 2015

(51) Int. Cl.

| | |
|---|---|
| G06Q 20/22 | (2012.01) |
| G06Q 20/34 | (2012.01) |
| G06Q 20/38 | (2012.01) |
| G06Q 20/40 | (2012.01) |
| G06Q 20/20 | (2012.01) |
| G06Q 30/00 | (2012.01) |

(52) U.S. Cl.
CPC ............ *G06Q 20/204* (2013.01); *G06Q 20/20* (2013.01); *G06Q 20/22* (2013.01); *G06Q 20/34* (2013.01); *G06Q 20/352* (2013.01); *G06Q 20/3574* (2013.01); *G06Q 20/38* (2013.01); *G06Q 20/405* (2013.01); *G06Q 30/00* (2013.01)

(58) Field of Classification Search
None
See application file for complete search history.

(56) References Cited

U.S. PATENT DOCUMENTS

| | | | |
|---|---|---|---|
| 7,229,014 B1 * | 6/2007 | Snyder | G06Q 20/16 235/380 |
| 2012/0109764 A1 * | 5/2012 | Martin | G06Q 20/204 705/17 |
| 2013/0179245 A1 * | 7/2013 | Simonoff | G06Q 30/0222 705/14.23 |

OTHER PUBLICATIONS

Paypal Mobile Wallet, Feb. 17, 2012, available at https://www.javelinstrategy.com/blog/2012/02/17/paypal-mobile-wallet-and-branding-cash-check-or-paypal/.*

* cited by examiner

*Primary Examiner* — Allen Chein
(74) *Attorney, Agent, or Firm* — Kilpatrick Townsend & Stockton LLP

(57) ABSTRACT

A merchant point-of-sale terminal may include a local merchant file having a list of preferred AIDs (application identifiers) determined by the merchant and used to select the payment vehicle used to conduct a transaction with a smart card. The list of preferred AIDs may be used in a priority established by the merchant.

22 Claims, 7 Drawing Sheets

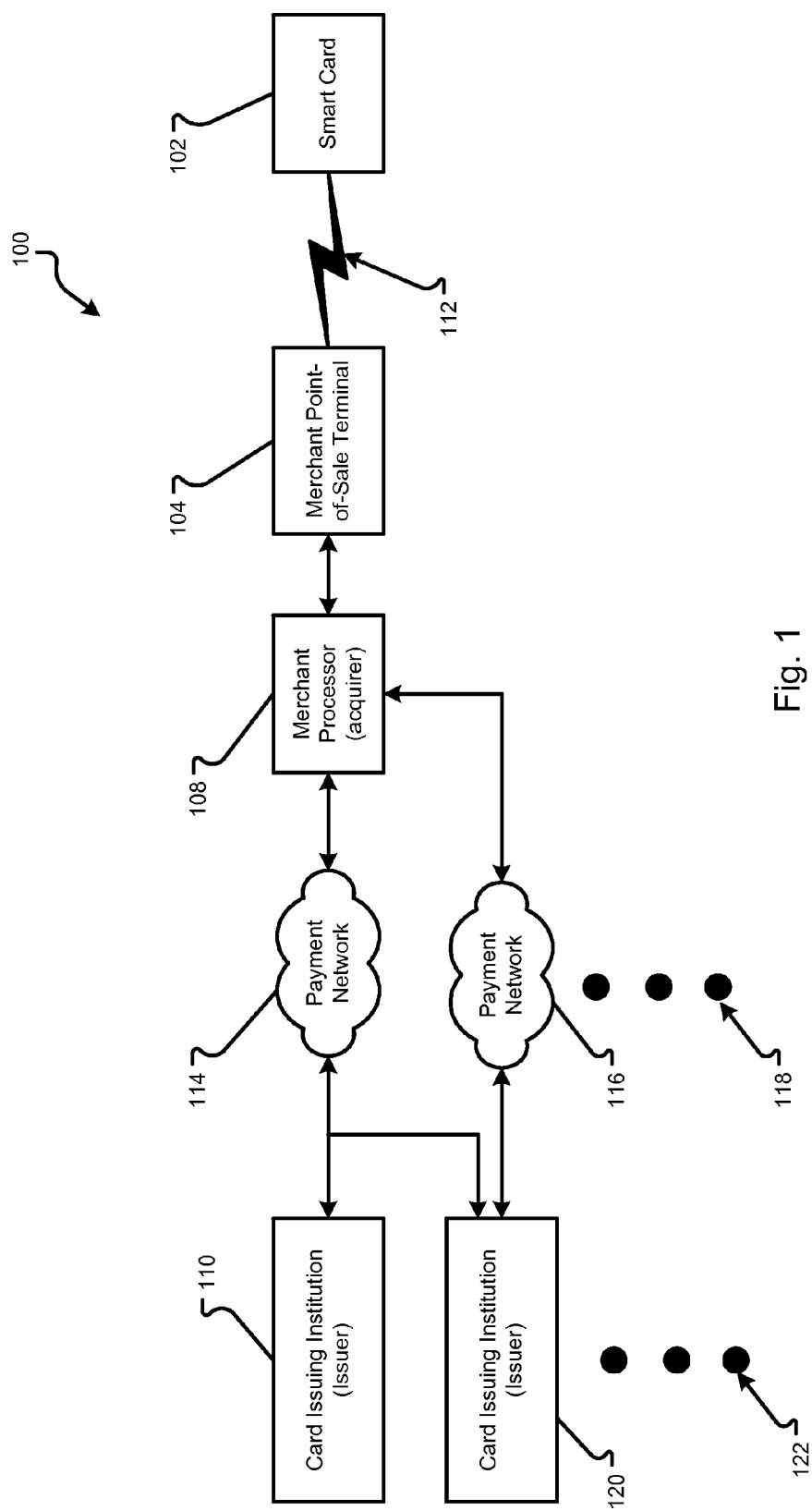

SELECTING MOBILE WALLET APPLICATION FOR A TRANSACTION CONDUCTED USING A SMART CARD

CROSS-REFERENCES TO RELATED APPLICATIONS

This application is related to U.S. application Ser. No. 12/203,842, filed Sep. 3, 2008, entitled "Enabling Consumer Choice on Contactless Transactions when Using a Duel-Branded Payment Instrument," the complete disclosure of which is herein incorporated by reference.

BACKGROUND OF THE INVENTION

When a user makes a purchase at a retail location using a smart transaction card, the specific account and payment processing network used is not necessarily known in advance. For example, with smart cards employing the EMV standard, any one of multiple cardholder accounts representing different payment vehicles (for example, credit card, debit card, etc.) may be accessed when using one card. The EMV standard defines the interaction between terminal and card at the physical, electrical, data and payment application levels. An EMV card may be a contact card requiring physical mating of electrical connectors on the card and a terminal, or may be a contactless card employing wireless signals, such as NFC (near field communications), to communicate with terminal. EMV standards are developed and maintained by EMVCo, and can be found at www.emvco.com.

A merchant terminal and an EMV smart card are programmed in advance with application identifiers (AIDs) that each identify a payment application (payment functions implemented in software code that are stored on the card) and also identify data or protocols associated with a payment vehicle, such as account type, card association/brand (e.g., VISA®, MASTERCARD®, DISCOVER®), and the payment processing network (e.g., STAR®, CIRRUS®, NYCE®, PULSE®). For example, an AID is set up by each payment network for transactions to be processed over that network. The payment network provides the AID to each merchant acquirer (merchant payment processor) and to each card issuer that might use the payment network. The merchant acquirer programs AIDs (received from one or more payment networks) into a payment processing system at the merchant POS terminal (e.g, a card reader system at the merchant POS terminal) in order to establish a list of AIDs (and corresponding payment applications) used by that merchant and its merchant acquirer. Likewise, a card issuer may program an EMV card in advance with a list of AIDs that are established by the card issuer. When an EMV card is introduced at a terminal, the terminal retrieves the list of AIDs stored on the card and compares that list to the list of AIDs established by the merchant acquirer and stored at the merchant terminal. Those AIDs that are common to both lists are placed in a "candidate list" which can be displayed to the customer for selection. Systems for determining a "candidate list" of AIDs for selection by a customer using an EMV smart card to conduct a transaction are known and are described, e.g., in U.S. Pat. No. 8,458,092, issued to Ward at al., U.S. Pat. No. 8,96,131, issued to von Beheren et al., U.S. Pat. No. 7,31,810, issued to Liue et al, and U.S. Pat. No. 7,103,575, issued to Linehan, each of which is hereby incorporated by reference.

However, current EMV standards do not make it feasible for the merchant to pick the final AID used for processing payment. In some cases the application and payment vehicle used may have consequences to the merchant, such as higher interchange fees. Thus it would be desirable for the merchant to have control over the application and payment vehicle used for a EMV card transaction conducted at the merchant POS terminal.

BRIEF SUMMARY OF THE INVENTION

There is provided, in accordance with embodiments of the invention, a system and method for using a merchant preferred list of application identifiers in order to determine an application identifier for use in conducting a transaction at a merchant terminal using a smart card.

In one embodiment, a method is provided for conducting a transaction at a merchant terminal using a smart card, wherein the transaction is processed using any one of a plurality of payment applications executed at the merchant terminal, and wherein each payment application is identified by an application identifier. The method includes storing, at the merchant terminal, a merchant file containing a merchant file list of one or more application identifiers (AIDs) established by the merchant and preferred by the merchant in conducting the transaction, each AID identifying one of the plurality of payment applications, with the AIDs in the merchant file list having a preferred order of use established by the merchant. The method further includes retrieving a terminal list of AIDs stored at the merchant terminal and established in advance by a payment processor of the merchant, receiving from the smart card a card list of AIDs established by an issuer of the card, comparing the list of AIDs stored at the merchant terminal with the list of AIDs established by the issuer, and creating a candidate list of AIDs, with the candidate list being those AIDs that are common to both the terminal list and the card list. The transaction is conducted at the merchant terminal using only AIDs in the candidate list that are also in the merchant file list.

BRIEF DESCRIPTION OF THE DRAWINGS

FIG. 1 is a block diagram of an embodiment of an electronic transaction processing system having one or more payment networks to process the transactions.

DETAILED DESCRIPTION OF THE INVENTION

Figure 2A:
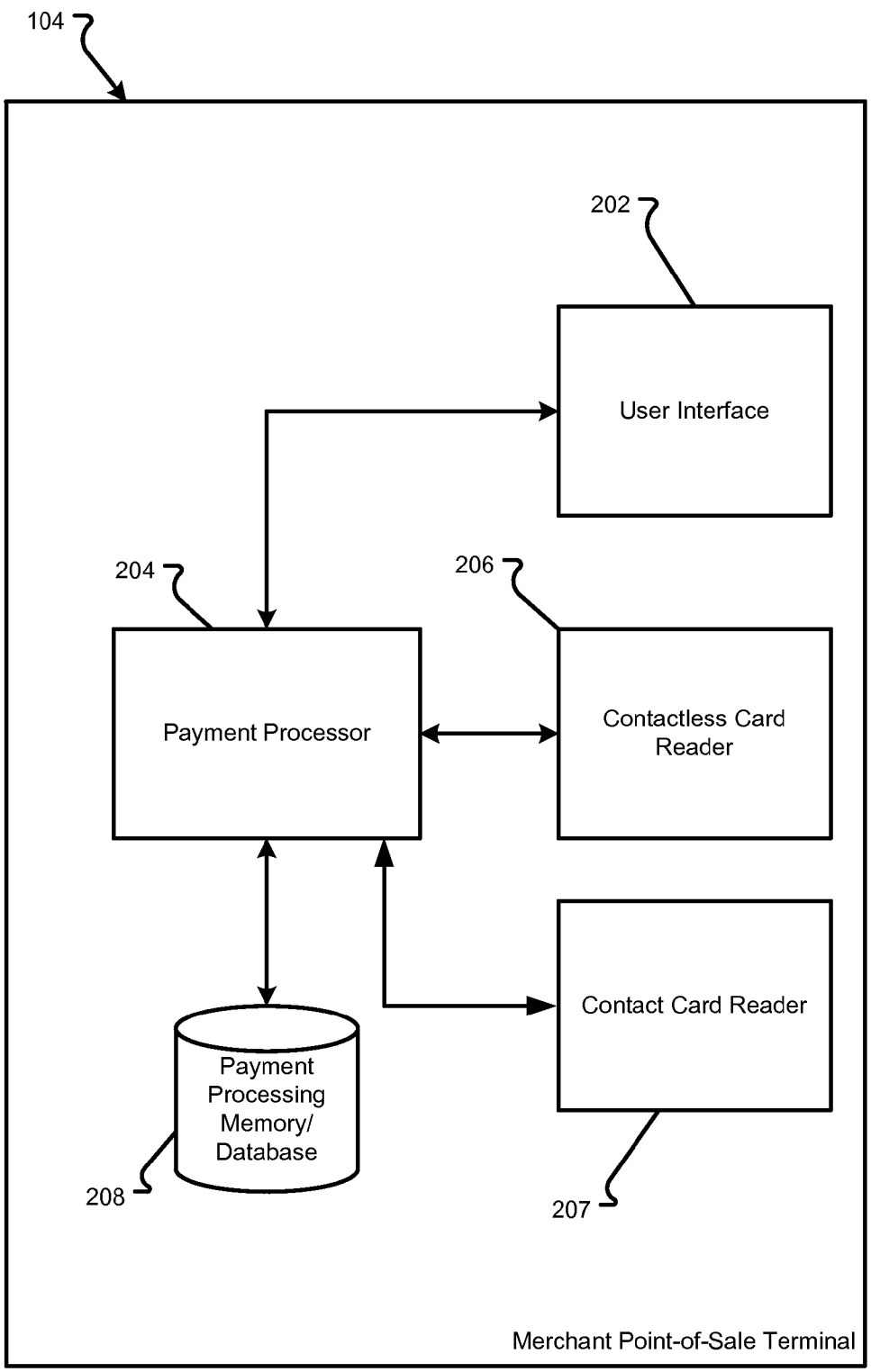
FIG. 2A is a block diagram of an embodiment of hardware at a merchant POS terminal.

Embodiments of the invention provide for merchant control over application identifiers (AIDs) that are selected for processing a transaction when a consumer/cardholder uses a smart card. As explained earlier, current EMV standards provide for a payment application to be selected by using a candidate list of AIDs that is developed by comparing the AIDs programmed for use at a merchant terminal by an acquirer with the AIDs programmed into the smart card by a card issuer. While the acquirer can influence which AIDs are used to process a transaction by the software it provides for payment processing, and the card issuer can influence which AIDs are used by its programming of the smart card, the merchant may have little influence. Described embodiments herein permit the merchant to control the use of AIDs by using a local merchant file containing a list of merchant preferred AIDs.

Before describing embodiments of the invention, the general environment in which smart cards are used will first be described. By way of example, a consumer may go to a grocery store and decide to buy a loaf of bread. The consumer may choose to pay for the bread by using a self-service checkout. To begin the transaction, the user may select a "checkout" option on a screen of a cash register (merchant POS terminal). The consumer may scan the UPC code for the bread. Then, the consumer may decide to use his or her smart card (e.g., a contactless smart device/card such Visa's payView device, or a contact payment device/card such as Visa's VSC/D card). Among other things, the payment process may allow the user to choose which payment network to use for a transaction (e.g., VISA, STAR, CIRRUS, NYCE, PULSE, etc.).

A contactless card is read by placing the card at or near a terminal/card reader. A contact smart card is read by inserting the card into a slot at a reader where electrical contact is made between contacts on the card and contacts at the reader.

The card reader at the terminal can read information from the payment card. This information may be related to a "credit" transaction. The "credit" transaction would use one of various payment networks (for example, VISA). The user may then be prompted to enter his or her own choice on the touch screen of the cash register. The information may also be related to a "debit" transaction. The debit transaction typically uses a different payment network (for example, STAR) than a credit transaction. Further, the consumer may be required to enter a PIN rather than sign for the transaction. The user may decide, by selection at the terminal, which form of payment transaction will take place. The selection is represented at the terminal by an application identifier (AID) which controls the payment application and the data and protocols used to complete transaction.

The payment information is compiled and sent over the payment network through the merchant's acquirer to the issuing bank or other issuing institution. The issuing institution authorizes the transaction and sends the authorization back to the cash register. The cash register completes the transaction, gives a receipt to the consumer, and the consumer leaves with the purchased bread.

Turning out to FIG. 1, there is illustrated a system 100 for providing electronic payment for a retail service or good that uses a payment device, such as a smart card 102, at a merchant point-of-sale (POS) terminal/system 104. For example, if the smart card 102 is a contactless card, a consumer may conduct an electronic transaction wirelessly using a near field communication (NFC) component on the card for communicating with NFC payment sensors at the merchant POS terminal 104. The NFC component may be a radio frequency identification device (RFID) or other type device that can send and receive information associated with a transaction. For example, the NFC component can be the PN531 transmission module offered by NXP Semiconductors, Eindhoven, Netherlands.

Alternatively, if the smart card 102 is a contact card, the consumer may conduct an electronic transaction by inserting the card into a reader for communicating directly with the reader by way of mating contacts on the card and the reader.

As seen in FIG. 1, a first communications channel 112 provides communications between the merchant POS terminal 104 and the smart card 102. The first communications channel 112 may be any type of communications system including wireless, wired, or other communication system. In one embodiment, the first communications channel 112 is a wireless communication channel, and, in some embodiments, is a NFC channel. If a wireless communication channel, the first communication channel can be Bluetooth®, 802.11g, or other wireless system. Thus, the communications channel may be a radio frequency system that allows a consumer to bring the contactless smart card 102 within close proximity of the merchant POS terminal 104 to establish communications. The bringing the contactless smart card 102 within close proximity of the merchant POS terminal 104 is sometimes referred to as a "tap" of the smart card 102 at a card reader.

In another embodiment, the first communications channel is a "wired" communications channel, implemented by physical connection or mating of contacts on the card and at the reader/POS terminal.

The merchant POS terminal 104, in embodiments, may be a terminal for completing a transaction for goods or services with a merchant, and may take the form of (among other things) a clerk-operated cash register/POS device, a self-service checkout device, a kiosk, etc. While the terms "POS terminal" or "merchant terminal" are used herein, it should be appreciated that the POS terminal may include a plurality of devices or systems at one or more merchant locations for performing the functions of the POS terminal 104. Further, while the merchant POS terminal 104 may have a wide variety of functions used to complete a transaction (e.g. a clerk-operated terminal may have a keyboard, display, barcode scanner, price lookup functionality, etc.), the relevant features of the merchant POS terminal for carrying out the purposes of the present invention relate to the exchange of data between the POS terminal 104 and the smart card 102, particularly the exchange and processing of data pertaining to the selection of an application identifier (AID) and its associated functionality for purposes of processing a payment using the smart card 102. For example, in disclosed embodiments, the relevant functionality may be included in a card reader system that forms part of the overall merchant POS terminal 104, which reader system may be provided (in whole or in part) to the merchant by the merchant's acquirer/payment processor. As will be more fully described later, this functionality includes AIDs that are programmed into the reader system/merchant POS terminal, and which are used in conjunction with AIDs that are programmed into the smart card 102 by the issuer of that card.

Accordingly, the merchant POS terminal 104 is operable to receive communications from and send communications to the smart card 102. Further, the merchant POS terminal 104 is operable to receive communications from and send communications to a merchant processor (acquirer) 108. In embodiments, the merchant POS terminal 104 communicates with the merchant processor 108 over a communications channel. In one embodiment, the communications channel may be wireless and the merchant POS terminal 104 communicates using wireless signals. In alternative embodiments, one or more portions of the communications channel between the merchant POS terminal 104 and the merchant processor 108 includes wired media, for example, a LAN, WAN, the Internet, a telephone network, etc.

The merchant processor 108, in embodiments, is an acquiring payment processor, a merchant acquirer, and/or other entity that processes credit or debit authorizations on behalf of a merchant. In embodiments, the merchant processor 108 may associated with two or more payment processing networks, such as the illustrated payment networks 114 and/or 116 (e.g., VISA, STAR, CIRRUS, NYCE, PULSE, etc.) to conduct electronic transactions, for example, credit, debit, stored value, etc. The merchant processor 108 may communicate authorization requests and receive authorizations or declinations of payment for a merchant over the payment networks 114 and 116. There may be more or fewer payment networks 114 and/or 116, as represented by the ellipses 118.

In embodiments, a merchant processor 108 sends an authorization request over one of several payment networks 114 and/or 116 to a card issuing institution (card issuer) 110 or 120 or to an issuing processor acting on behalf of the issuing institution 110 or 120. There may be more than two card issuing institutions, as indicated by ellipses 122. Also as illustrated in FIG. 1, either one of the payment networks 114, 116 can interface with two or more card issuing institutions 110 and/or 120. The card issuing institutions 110 and 120, in embodiments, are financial institutions (such as banks) that approve transactions for a consumer and send authorizations to the merchant processor 108. After an authorization is received, the transaction can be completed by the merchant POS terminal 104.

In an example, a consumer selects a good to purchase at a grocery store. The consumer brings the good to a cash register that is the merchant POS terminal 104. The information for the good is entered. For example, the universal purchase code (UPC) is scanned by a UPC reader, and the purchase information, the type of good, purchase price, etc., associated with the UPC is retrieved from a database. In one embodiment, the consumer uses a card reader at the merchant POS terminal 104 to start a credit or debit transaction using a smart card 102. For example, the consumer may begin a credit or debit transaction by tapping the smart card 102 (if contactless) at a reader of the merchant POS terminal 104. The merchant POS terminal 104 sends a signal to the smart card 102 to request credit or debit information. The smart card 102 retrieves the information and sends the information to the merchant POS terminal 104, for determining the payment vehicle (account, payment network, etc.) to be used.

The merchant POS terminal 104 receives the transaction information. In embodiments, the transaction information is presented to the consumer on the merchant POS terminal 104 for approval. The consumer may enter a signature (if a credit transaction) or personal identification number (PIN) if a debit card transaction. The merchant POS terminal 104 can compile and append the transaction information to the credit or debit information received from the smart card 102. The combined information is, in embodiments, encrypted and sent to the merchant processor 108.

The merchant processor 108 receives the payment and transaction information. In embodiments, the merchant processor 108 sends an authorization request to one of the card issuing institutions 110, 120 over one of the payment networks 114, 116. The specific payment network that is used for the transaction is controlled by (among other things) the type of credit or debit transaction determined at the merchant POS terminal, in a manner to be described shortly. The card issuing institution may then processes the authorization request and issue an authorization to the merchant processor 108. In embodiments, the merchant processor 108 sends the authorization to the merchant POS terminal 104, which completes the transaction.

Figure 2B:
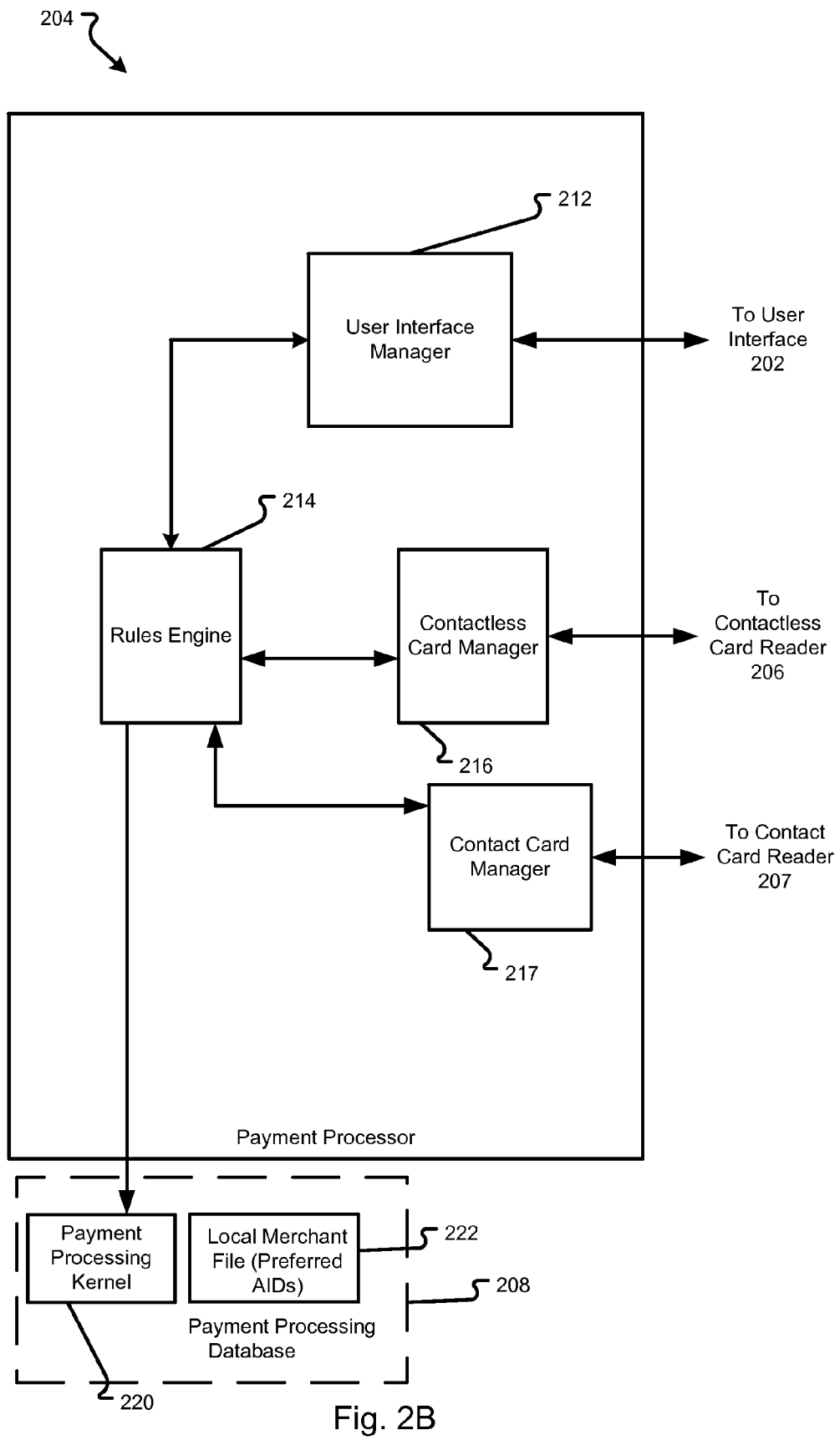
FIG. 2B is a block diagram of an embodiment of software at a merchant POS terminal.

An embodiment of a merchant POS terminal 104 (as it relates to payment processing functions) is shown in FIGS. 2A and 2B. The merchant POS terminal 104 comprises a user interface 202, a payment processor 204, a contactless card reader 206, a contact card reader 207, and a payment processing memory/database 208. The illustrated merchant POS terminal 104 can be a computer system as described in conjunction with FIG. 6.

The user interface 202, in embodiments, is a display and/or a device or system to receive consumer inputs and/or provide a display of information to the consumer. For example, the display is an LCD or plasma screen and includes a keyboard or touch screen to receive user inputs. The contactless card reader 206 is software and/or a system that can wirelessly communicate with the smart card 102 (if a contactless smart card). The contactless reader 206, in embodiments, is an NFC compliant interface, which may be radio frequency, Bluetooth, infrared, ultraviolet, 802.11g, or other technology. In embodiments, the contactless card reader 206 not only reads payment information from the contactless smart card 102 (FIG. 1), but also can send signals to the smart card 102. The contact card reader 207, in embodiments, is a card reader device with electrical contacts/terminals that establish electrical contact with contacts/terminals on the smart card 102 (if a contact smart card). The contactless card reader 206 and contact card reader 207 can each receive a request (for an application identifier) from the payment processor 204 and forward the request to the smart card 102 (FIG. 1).

The payment processor 204 is hardware, software, or hardware and software for processing the payment transaction using payment information from the smart card 102. The payment processor 204 determines, among other things, the type of payment vehicle (e.g., credit or debit) used to pay for retail services using the merchant POS terminal 104. The payment information, in embodiments, includes a credit card number, a debit card number, a PIN, an account number, a password, payer authentication information, or other information required to pay for a retail service or good. In some embodiments, part of the payment information may be the user's choice of paying using a credit or debit transaction. In some embodiments the payment processor 204 may interact with the user interface 202 to allow the cardholder/user to select or approve which account or payment options (e.g., debit or credit) the user desires. In other embodiments, the payment processor 204 determines the type of payment based on AIDs programmed into the merchant point-of-sale terminal 104 and the smart card 102, without selection by the cardholder.

The payment processing memory/database 208 stores information relative to options on the type of payment vehicle and payment network to be used. As will be described shortly, the options are identified by application identifiers (AIDs) stored at the database 208. Such AIDs are established by the merchant processor 108, and in embodiments of the invention, are also established by the merchant operating the POS terminal 104.

An embodiment of a payment processor 204 is shown in FIG. 2B. The one or more components shown in FIG. 2B are software modules, software components, code, etc., for completing the functions described herein. The user interface manager 212 communicates with and manages communications between the user interface 202 and a rules engine 214. For example, the user interface manager 212 provides or renders one or more display screens for the user interface 202 (FIG. 2A). The user interface manager 212 can also receive, translate, interpret, or react to consumer inputs from user input devices, for example, a keyboard or a touch screen.

The contactless card manager 216 is software and/or a system that can communicate with and manage communications between the reader 206 and rules engine 214. Similarly, the contact card manager 217 is software and/or a system that can communicate with and manage communications between contact card reader 207 and rules engine 214. The readers 206 and 207, in embodiments, may each receive an application identifier from the rules engine 214 identifying a type of transaction and application data 315 (FIG. 3) needed for the transaction. The smart card 102 (FIG. 1) can receive the identifier and send back the requested application data 315 (FIG. 3) to the appropriate reader 206 or 207. The reader 206 or 207 forwards the application data 315 (FIG. 3) through the rules engine 214 or other processor to complete the transaction.

In embodiments, the rules engine 214 interfaces with the payment processing database 208. The payment processing database 208 is software that stores data in a storage medium and retrieves the data from the storage medium, and includes a payment processing kernel 220 and a local merchant file 222. The payment processing database 208 can respond to requests from the rules engine 214 to store or retrieve data. An acquirer can provide one or more established identifiers (AIDs) as to the type of transaction (e.g., debit or credit) or payment network 114 or 116 used for the transaction, stored in the payment processing kernel 220 of payment processing database 218. The merchant can separately provide a merchant preferred list of AIDs to be stored as a local merchant file 222 within the payment processing database 208.

The rules engine 214, in embodiments, includes software logic that determines (among other things) what payment network 114 or 116 to use for a transaction. The rules engine 214 can use the established AIDs from the acquirer (stored at kernel 222), the list of merchant preferred AIDs at file 222, the AIDs stored on the card 102, and other factors to determine what payment network 114 or 116 to use for the transaction. The rules engine 214, in embodiments, communicates a selected application identifier 314 (FIG. 3) to the appropriate reader 206, 207 and receives application data 315 returned by the smart card 102. In some embodiments, the rules engine 214 requests information from the consumer through the user interface manager 212 and receives replies for consumer preferences. The rules engine 214 can accumulate the information and forward the information to the merchant processor 108 (FIG. 1) to request transaction authorization over the determined payment network 114 or 116.

Figure 3:
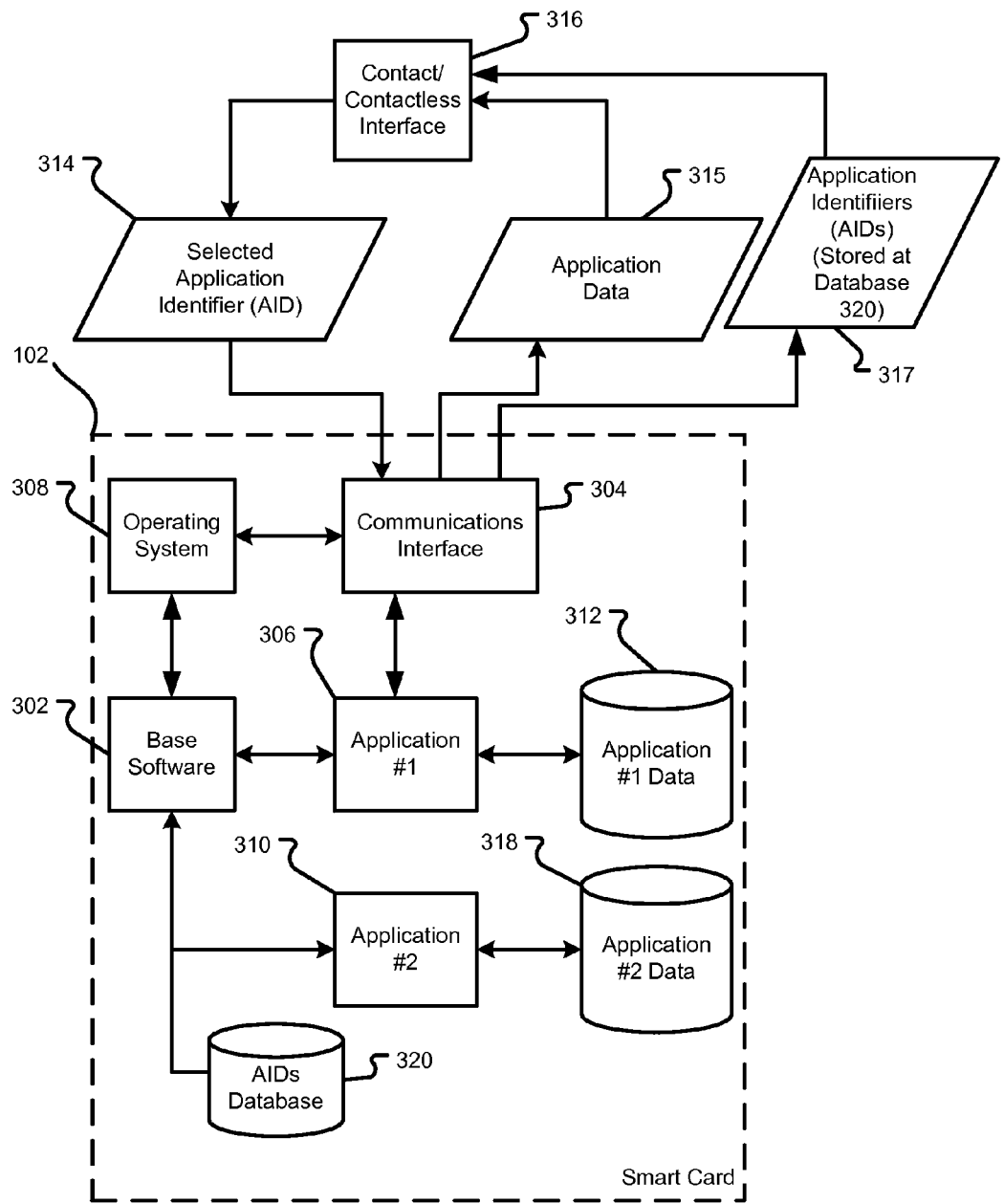
FIG. 3 is a block diagram of an embodiment of software at a payment card or device.

An embodiment of a smart card 102 is shown in FIG. 3. The components of smart card 102 represent one or more hardware, software, or hardware and software modules or applications. The one or more applications may be executed in a processor resident on the smart card. The smart card 102, in embodiments, comprises an operating system 308 and two or more mobile wallet applications 306 and/or 310 (each including code that, when executed and among other things, retrieves application data). The smart card 102 further comprises a communications interface 304, a base software application 302, two or more application data databases 312 and 318, and an AIDs database 320.

The operating system 308 is the software that controls one or more other applications and provides access to hardware components. In embodiments, the operating system 308 initializes, instantiates, and/or configures the applications 306 and/or 310, the base software 302, and/or the communications interface 304. The operating system 308 can receive one or more signals from the communications interface 304 and forward the signals to the base software 302. The operating system 308 can likewise receive one or more signals from the base software 302 and forward the signals to the communications interface 304.

The communications interface 304 is used to communicate data between the contact/contactless interface 316 (in the merchant POS terminal 104) and the smart card 102. When communications are initially established between the merchant POS 104 and the smart card 102, the merchant POS terminal can request and receive AIDs 317 from the AIDs database 320. In response to receiving the AIDs in the AIDs database 320 (by way of communications interface 304), the merchant terminal 104 can determine an AID 314 selected at the POS terminal 104 to be used for processing a transaction, and return the selected AID 314 to the smart card 102. Further, in response to receiving the selected AID 314, the smart card 102 returns application data 315 via communications interface 304 to the POS terminal 104. Thus, after the initiation of a request for a transaction from the smart card 102, the communications between the communications interface 104 and the contact/contactless interface 316 provides three different flows of data represented in FIG. 3, namely, AIDs 317 from the smart card 102 to the POS terminal 104, the selected AID 314 from the merchant POS terminal 104 to the smart card 102, and application data 315 pertaining to the payment type and account from the smart card 102 to the merchant POS terminal 104.

In one embodiment, the communications interface 304 is an NFC device that can both receive from and transmit wireless signals to an NFC sensor application at the POS terminal 104 represented by the contact/contactless interface 316. In another embodiment, the communications interface 304 represents electrical contacts (and associated circuitry) which mate or connect with corresponding electrical contacts at the contact/contactless interface 316. The communications interface 304 may be under the control of the operating system 308.

The contact/contactless interface 316 in FIG. 3 is the same or similar to the card reader 206 and/or card reader 207 seen in FIG. 2A. The interface 316 may include one or more software components for exchanging AIDs 318, selected AID 314, and the application data 315 used to complete a transaction with smart card 102.

The base software 302 can manage AIDs in the AIDs database 320 and retrieve AIDs from the database 320 when a transaction is initiated (the AIDs database or memory 320 stores AIDs that have been programmed onto the smart card 102 by the card issuer). The base software 302 may also receive the selected AID 314 from the communications interface 304 after the AID 314 has been selected by the merchant POS terminal 104. The base software 302 determines which application 306 or 310 the selected application identifier 314 is associated with. In one embodiment, the base software 302 stores the associations between the identifiers and the applications 306 or 310 and searches for the identifier to determine the association. After determining the application 306 or 310 associated with the identifier, the base software 302 can pass a request for application data 315 to one of the applications 306 or 310.

While the smart card 102 is illustrated as having two applications 306 and 310, the actual number of applications will depend on the number of AIDs stored at the AIDs database 320. The applications 306 and/or 310 are software that provides payment data for a type of transaction. For example, application 306 (application #1) might provide an account number, VISA payment network information, account holder information, issuer bank information, etc. for a credit transaction. Application 310 (application #2) might provide the same account number or a different account number, STAR payment network information, account holder information, issuer bank information, etc. for a debit transaction. Thus, for each type of payment transaction there is an associated application. When a merchant preference requires one type of transaction, the application identifier 314 for the application related to that type of transaction is provided to the smart card 102. The smart card 102 can then retrieve the information from the application associated with the identifier.

The applications 306 and/or 310 can store or extract application data 315 from application database 312 and/or 318, which may be implemented in a storage medium of the contactless smart card 102. The application database 312 and/or 318 can include information about the user (the user's name, address, phone number, email address, etc.), information about payment types for the user (account numbers, expiration dates, stored value accounts, gift card numbers, checking account numbers, other account information), security information (passwords, login credentials, etc.), issuing bank information, and/or any other information needed to transact business with the merchant POS terminal 104. The applications 306 and/or 310 can manage the information in the application database 312 and/or 318.

Figure 4:
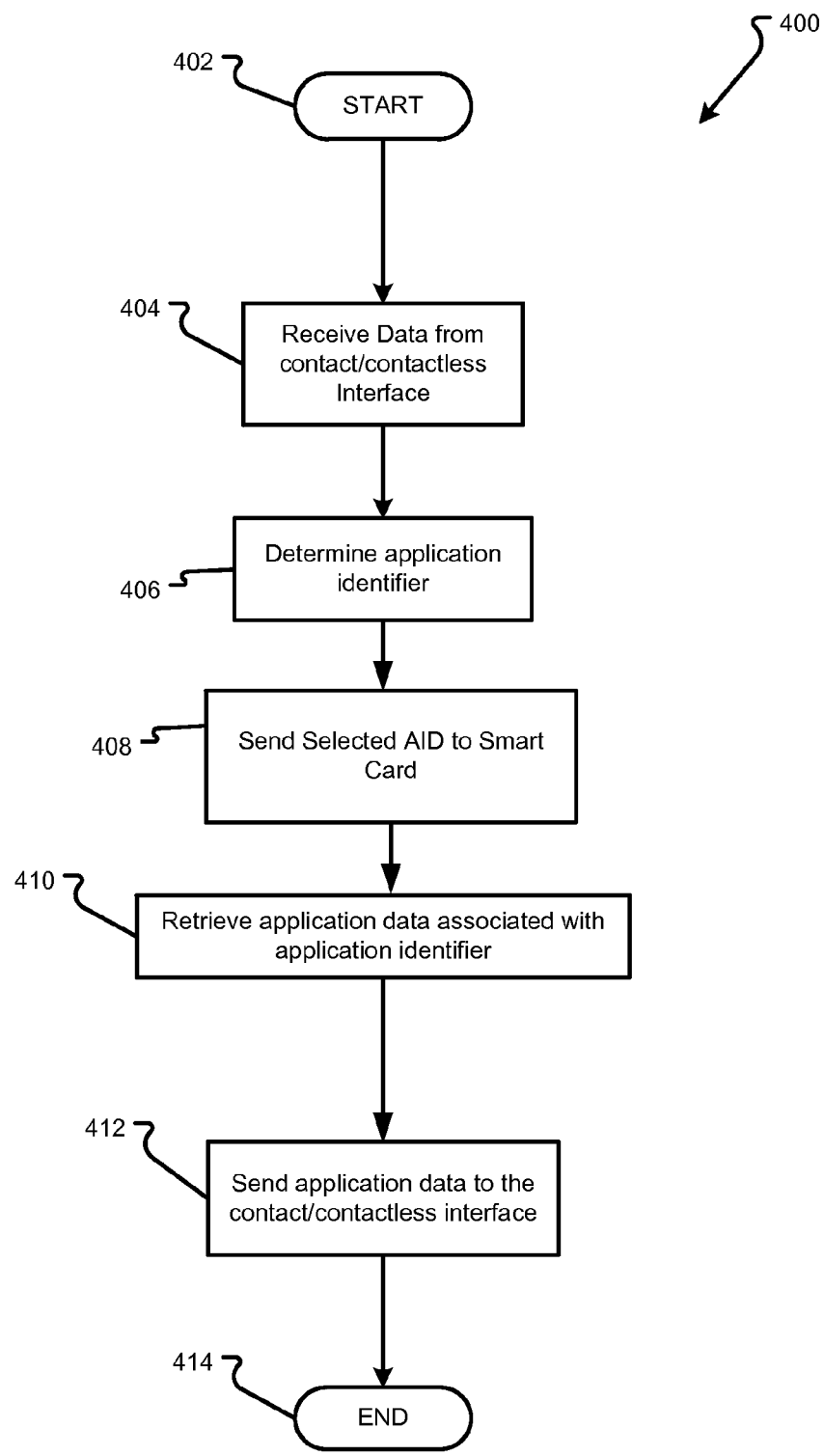
FIG. 4 is a flow diagram of an embodiment of a method for processing an electronic transaction using a payment card.

An embodiment of a general method 400 for processing a transaction with a smart card having two or more possible payment options is shown in FIG. 4. The method 400 generally begins with a START operation 402 and terminates with an END operation 414. The steps shown in the method 400 may be executed in a computer system as a set of computer executable instructions. While a logical order is shown in FIG. 4, the steps shown or described can, in some circumstances, be executed in a different order than presented herein.

At step 404, the POS terminal 104 receives data from a consumer in the form of a request for a transaction at the contact/contactless interface 316 of the merchant POS terminal. For example, the consumer may select one or more items on a user interface 202 (FIG. 2A) that indicate that a transaction is about to occur. In one embodiment, the consumer selects a touch screen icon that indicates the user want to complete a self-checkout from a grocery store. In other embodiments, a salesperson can select a user interface item to start the transaction. In yet other embodiments, the "tapping" of a contactless smart card at the merchant POS terminal 104 or the insertion of a contact card into a slot at the merchant POS terminal 104 may initiate the request for a transaction.

At step 406, the POS terminal determines an application identifier to be used for the transaction based on application identifiers stored in the POS terminal and application identifiers received from the smart card 300, as will be described in greater detail later in connection with FIG. 5.

In response, at step 408 the merchant POS terminal sends the selected application identifier 314 to the smart card 102 in order to retrieve application data needed to conduct the transaction. In embodiments, the application identifier 314 (FIG. 3) identifies the application type (debit or credit) for the smart card 102 (FIG. 1). At step 410, the required application data associated with the selected application identifier is retrieved within the smart card 102, and at step 412 the retrieved application data is sent to the contact/contactless interface 316 within the merchant POS terminal 104. The application data 315 can be any data needed from the smart card (FIG. 1) to complete the transaction. Application data 315 can include account numbers, consumer information, an issuing institution for the smart card 102, etc.

Figure 5:
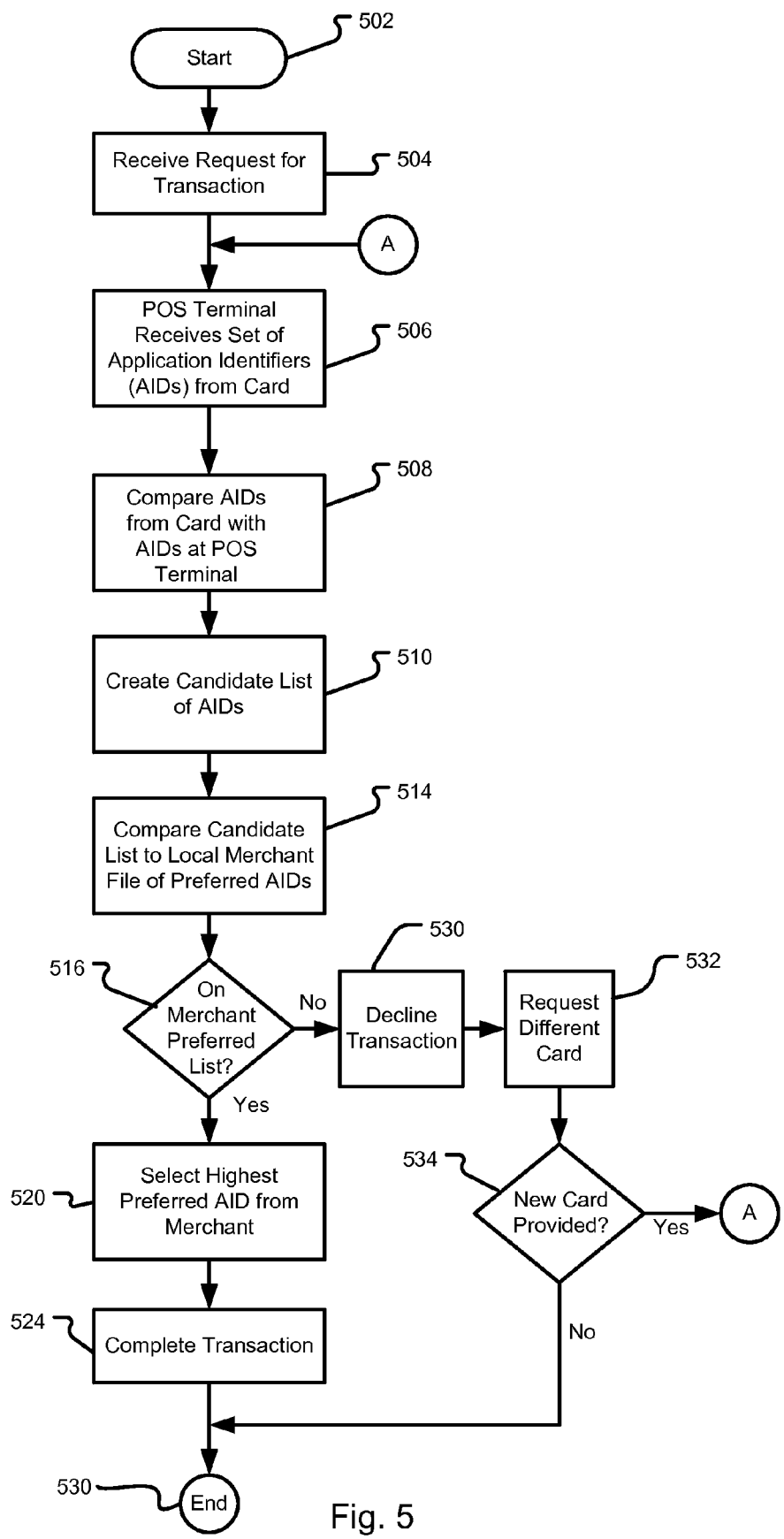
FIG. 5 is a more detailed flow diagram of a method for processing an electronic transaction, wherein a payment application is determined for processing the transaction.

FIG. 5 illustrates a more detailed process for determining an application identifier to be used for conducting a transaction at the merchant POS terminal 104. The method 500 is largely carried out within the merchant point-of-sale terminal 104, and generally begins with a START operation 502 and terminates with an END operation 530.

At step 504, the merchant POS terminal 104 receives, at the user interface 202 (FIG. 2A), a request for a transaction. Alternatively, in some embodiments, the request for a transaction may be initiated at the contactless card reader 206 (by sensing a nearby contactless smart card 102) or at contact card reader 207 (by insertion of a contact smart card 102 at the reader). At step 506, the merchant POS terminal receives a set of application identifiers (AIDs) from smart card 102, e.g. stored at the database 320 (FIG. 3) within smart card 102. At step 508, the application identifiers received from the smart card are compared to the application identifiers stored at the merchant POS terminal by the merchant processor/acquirer, i.e., stored at the time of programming by the merchant processor/acquirer within the payment processing kernel 220 (FIG. 2B). The comparison at step 508 yields a candidate list of application identifiers created at step 510.

As noted earlier, the candidate list of application identifiers created at step 510 are created from those generally selected by the card issuer (stored within smart card 102) and the merchant acquirer 106 (stored within the payment processing kernel 220), with application identifiers in common forming the candidate list. The candidate list does not reflect the preferences of the merchant. As such, the merchant may create its own list of preferred application identifiers which are stored at the merchant POS terminal (local merchant file 222) in advance by the merchant. For example, the merchant processor/acquirer 108 may provide AIDs (apart from those programmed into the POS terminal) to the merchant, and from which the merchant may select those that are preferred for use with transactions conducted at the merchant.

As an example, the following represents a list of application identifiers that might be stored within the local merchant file 222 at the merchant POS terminal 104:

| Merchant Defined AIDs | |
|---|---|
| Priority | AID |
| 1 | 242434342424 |
| 2 | 523534535252 |
| 3 | 626363626262 |
| 4 | 5353575634733 |
| 5 | 278237237627 |
| 6 | 929236367377 |
| 7 | 92993473783768 |

As can be seen from the foregoing table, each application identifier is given a priority/preference, e.g., from "1" to "7," with 1 being the highest priority (most preferred) application identifier and 7 being the lowest (least preferred). It should be appreciated that in actual practice the merchant may have fewer or more preferred application identifiers.

Among other things, the merchant may determine application identifiers to include in the local merchant file based on the cost of interchange fees and other fees that may be imposed on the merchant to conduct the transaction.

Returning to FIG. 5, at step 514 the merchant POS terminal compares the candidate list of application identifiers (created at step 510) to the merchant preferred application identifiers (stored at file 222). At step 516 the merchant point-of-sale terminal determines if any of the merchant preferred application identifiers are in the candidate list. If so, the highest priority application identifier from the merchant is selected for use in the transaction at step 520 and the transaction is completed using that application identifier at step 524. If none of the merchant preferred application identifiers are determined to be in the candidate list at step 516, then the transaction is declined at step 530. As part of declining the request, the merchant POS terminal may request that the customer use a different card (step 532). If a new card is provided by the customer at step 534, the process returns to point A in the flow diagram and repeats steps 506-524 in order to complete the transaction. If no new card is provided at step 532, the process ends.

While not illustrated in FIG. 5, in alternative embodiments the user or cardholder may be permitted to select from among the merchant preferred AIDs stored at the local merchant file 222. For example, once the payment processor 204 has determined which, if any of the merchant preferred AIDs can be found in the candidate list (steps 514 and 516), rather than merely selecting the highest preferred AID, the payment processor 204 may provide the merchant preferred AIDs (from those found in the candidate list) to the user interface 202 for display. The user may be prompted to select an AID (application identifier) from among those preferred by the merchant. The merchant preferred AIDs may be displayed in the order of priority preferred by the merchant. In some embodiments the user may be encouraged to use the highest priority AID preferred by the merchant, by providing an incentive to the user to select the highest priority AID (such as by displaying an offer of a financial rebate or other financial incentive to the consumer/user).

Figure 6:
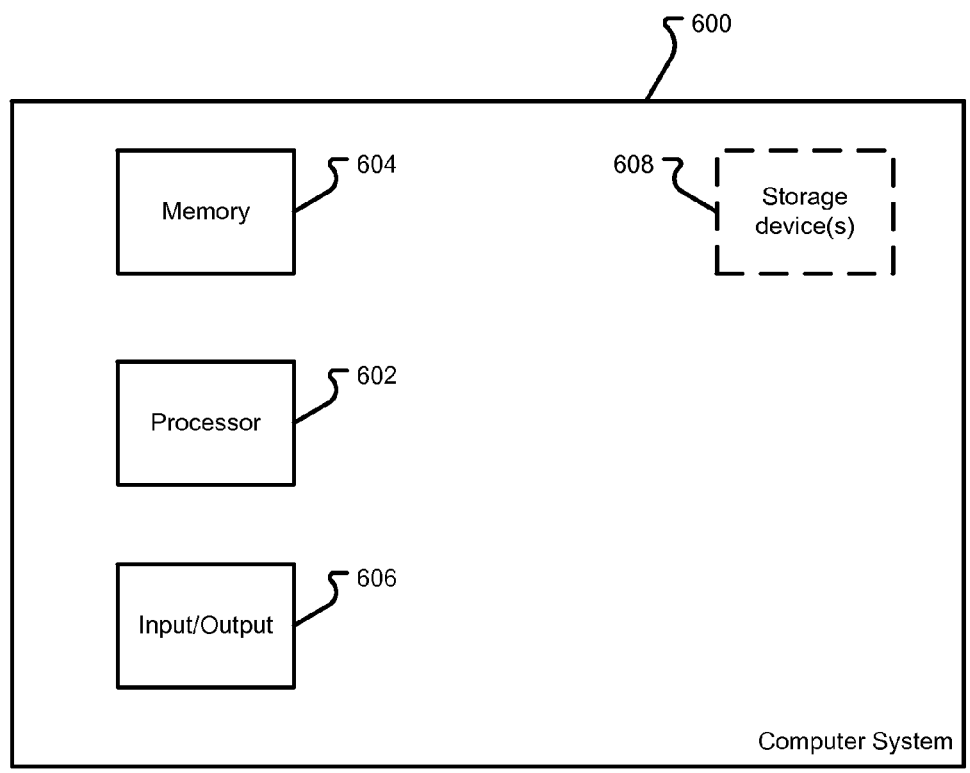
FIG. 6 is a block diagram of an embodiment of a computer system that could be used in implementing one or more components described herein.

An embodiment of a computer system 600 operable to function as one or more components or systems described herein, such as the smart card 102 (FIG. 1) or the merchant POS device 104 (FIG. 1), is shown in FIG. 6. In embodiments, the computer system 600 comprises a processor 602 for executing one or more instructions in software stored on computer-readable medium, such as memory 604 or storage device(s) 608. The instructions may perform a method, such as methods described in conjunction with FIGS. 4 and 5. The processor 602 may be the same or similar to the payment processor 204 (FIG. 2A) or to a processor operating in the smart card 102 (FIG. 3). The computer system 600, in embodiments, also includes input/output (I/O) devices or components 606. The I/O components 606 can include network interface cards, routers, hardware for communicating with peripherals (e.g., printers, monitors, etc.), software drivers, NFC components, or any other hardware or software needed to receive or send information as described herein.

The computer system 600 can also comprise software elements located within the working memory 604, including an operating system (the same or similar to operating system 308 (FIG. 3)) and/or other code, such as one or more application programs, which may comprise computer programs as described herein, and/or may be designed to implement methods and/or configure systems, as described herein. Merely by way of example, one or more procedures described with respect to the method(s) discussed above might be implemented as code and/or instructions executable by a computer (and/or a processor within a computer).

A set of these instructions and/or code might be stored on a computer-readable storage medium, such as the storage device(s) 608 described above. In some cases, the storage medium might be incorporated within a computer system, such as the payment processing database 208 (FIG. 2A), the application #1 database 312, the application #2 database 318, and the AIDs database 320 (FIG. 3). In other embodiments, the storage medium might be separate from the computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

While various aspects of embodiments of the disclosure have been summarized above, the following detailed description illustrates exemplary embodiments in further detail to enable one of skill in the art to practice the disclosure. In the preceding description, for the purposes of explanation, numerous specific details are set forth in order to provide an understanding of the present disclosure. It will be apparent, however, to one skilled in the art that the present disclosure may be practiced without some of these specific details. In other instances, well-known structures and devices are shown in block diagram form. Several embodiments of the disclosure are described above, and while various features are ascribed to different embodiments, it should be appreciated that the features described with respect to one embodiment may be incorporated with another embodiment as well. By the same token, however, no single feature or features of any described embodiment should be considered essential to the disclosure, as other embodiments of the disclosure may omit such features.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a software component, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

What is claimed is:

1. A method for conducting a transaction at a merchant terminal using a smart card, wherein the transaction is processed using any one of a plurality of payment applications executed at the merchant terminal, each payment application identified by an application identifier, the method comprising:
   storing, at the merchant terminal, a merchant file containing a merchant file list of one or more application identifiers (AIDs) established by the merchant and preferred by the merchant in conducting the transaction, each AID identifying one of the plurality of payment applications, with the AIDs in the merchant file list having a preferred order of use established by the merchant;
   storing, at the merchant terminal, a terminal list of AIDS from the merchant file list of AIDs and established in advance by a payment processor of the merchant;
   retrieving the terminal list of AIDs stored at the merchant terminal and established in advance by the payment processor of the merchant;
   receiving from the smart card a card list of AIDs established by an issuer of the card;
   comparing the terminal list of AIDs stored at the merchant terminal and established in advance by the payment processor with the card list of AIDs established by the issuer;
   creating a candidate list of AIDs, with the candidate list being those AIDs that are common to both the terminal list and the card list;
   comparing the created candidate list of AIDs to the merchant file list of AIDs established and preferred by the merchant in order to identify AIDs in the candidate list that are also in the merchant file list; and
   conducting the transaction at the merchant terminal using only AIDs in the candidate list that are also in the merchant file list.

2. The method of claim 1, wherein conducting the transaction at the merchant terminal comprises:
   selecting one of the AIDs that is in the candidate list and also in the merchant file list;
   providing the selected AID to the smart card in order to retrieve application data stored on the smart card and associated with the selected AID; and
   providing the retrieved application data to the merchant terminal for use in conducting the transaction.

3. The method of claim 2, wherein the selection of one of the AIDs in the candidate list that is also in the merchant file list is based on the preferred order of use established by the merchant.

4. The method of claim 3, wherein the preferred order of use established by the merchant for the AIDs in the merchant file list is arranged from highest to lowest, and wherein selecting one of the AIDs that is in the candidate list and also in the merchant file list comprises:
   selecting an AID in the candidate list that is highest in the preferred order of use established by the merchant.

5. The method of claim 1, further comprising declining the transaction at the merchant terminal when there is no AID in the candidate list that is also in the merchant file list.

6. The method of claim 5, further comprising providing a request to a cardholder at the merchant terminal to use a different smart card when the transaction is declined.

7. The method of claim 1, further comprising:
   displaying, at the merchant terminal, the AIDs in the candidate list that are also in the merchant file list; and
   receiving, at the merchant terminal, a selection from a cardholder of one of the displayed AIDs.

8. The method of claim 7, wherein the AIDs displayed at the merchant terminal are displayed in the preferred order of use by the merchant.

9. The method of claim 7, further comprising:
   displaying an offer of a financial incentive at the merchant terminal for the cardholder to select one of the displayed AIDs, the financial incentive based on the preferred order of use established by the merchant.

10. The method of claim 1, wherein the merchant terminal is a merchant point-of-sale (POS) system.

11. The method of claim 1, wherein the transaction is a debit card transaction or a credit card transaction.

12. A system for conducting a transaction at a merchant terminal using a smart card, wherein the transaction is processed using any one of a plurality of payment applications executed at the merchant terminal, each payment application identified by an application identifier, the system comprising:
   a processor; and
   a memory, the memory having stored therein a sequence of instructions which, when executed by the processor, cause the processor to:
   store, at the merchant terminal, a merchant file containing a merchant file list of one or more application identifiers (AIDs) established by the merchant and preferred by the merchant in conducting the transaction, each AID identifying one of the plurality of payment applications, with the AIDs in the merchant file list having a preferred order of use established by the merchant;
   store, at the merchant terminal, a terminal list of AIDs separate from the merchant file list of AIDs and established in advance by a payment processor of the merchant;
   retrieve the terminal list of AIDs stored at the merchant terminal and established in advance by the payment processor of the merchant;
   receive from the smart card a card list of AIDs established by an issuer of the card;
   compare the terminal list of AIDs stored at the merchant terminal and established in advance by a payment processor with the card list of AIDs established by the issuer;
   create a candidate list of AIDs, with the candidate list being those AIDs that are common to both the terminal list and the card list;
   compare the created candidate list of AIDs to the merchant file list of AIDs established and preferred by the merchant in order to identify AIDs in the candidate list that are also in the merchant file list; and
   conduct the transaction at the merchant terminal using only AIDs in the candidate list that are also in the merchant file list.

13. The system of claim 12, wherein the instructions, when executed by the processor, further cause the processor to:

select one of the AIDs that is in the candidate list and also in the merchant file list;

provide the selected AID to the smart card in order to retrieve application data stored on the smart card and associated with the selected AID; and provide the retrieved application data to the merchant terminal for use in conducting the transaction.

14. The system of claim 13, wherein the selection of one of the AIDs in the candidate list that is also in the merchant file list is based on the preferred order of use established by the merchant.

15. The system of claim 14, wherein the preferred order of use established by the merchant for the AIDs in the merchant file list is arranged from highest to lowest, and wherein selection of one of the AIDs that is in the candidate list and also in the merchant file list comprises:

selecting an AID in the candidate list that is highest in the preferred order of use established by the merchant.

16. The system of claim 12, wherein the instructions, when executed by the processor, further cause the processor to decline the transaction at the merchant terminal when there is no AID in the candidate list that is also in the merchant file list.

17. The system of claim 16, wherein the instructions, when executed by the processor, further cause the processor to provide a request to a cardholder at the merchant terminal to use a different smart card when the transaction is declined.

18. The system of claim 12 wherein the instructions, when executed by the processor, further cause the processor to:

display, at the merchant terminal, the AIDs in the candidate list that are also in the merchant file list; and receive, at the merchant terminal, a selection from a cardholder of one of the displayed AIDs.

19. The system of claim 18, wherein the AIDs displayed at the merchant terminal are displayed in the preferred order of use by the merchant.

20. The system of claim 18, wherein the instructions, when executed by the processor, further cause the processor to:

display an offer of a financial incentive at the merchant terminal for the cardholder to select one of the displayed AIDs, the financial incentive based on the preferred order of use established by the merchant.

21. The method of claim 12, wherein the merchant terminal is a merchant point-of-sale (POS) system.

22. The system of claim 12, wherein the transaction is a debit card transaction or a credit card transaction.

* * * * *